Nov. 16, 1971    G. K. GANTSCHNIGG    3,620,043
SPLINE-TYPE PIVOTS, UNIVERSAL JOINTS AND FLEXIBLE COUPLINGS
Filed May 12, 1970    2 Sheets-Sheet 1

INVENTOR
GOTTFRIED K. GANTSCHNIGG

BY Stevens, Davis, Miller & Mosher
ATTORNEYS

3,620,043
SPLINE-TYPE PIVOTS, UNIVERSAL JOINTS AND FLEXIBLE COUPLINGS
Gottfried K. Gantschnigg, Crownsville, Md., assignor to ARINC Research Corporation, Annapolis, Md.
Filed May 12, 1970, Ser. No. 36,515
Int. Cl. F16d 3/18
U.S. Cl. 64—9 R                                           11 Claims

ABSTRACT OF THE DISCLOSURE

A universal joint and the like which obviates the need for the conventional double-pivot, three member arrangement by providing a plurality of equally spaced bearing surfaces on each of a pair of cooperating members. One of the members is the shaft or male portion and is provided with a plurality of substantially circular shaped and profiled segments integrally formed thereon. The other member is the housing or female portion and has a like number of recessed surfaces formed with an arcuate configuration. The shape of this arcuate configuration may be varied according to the intended use. For example, it may be circular with a radius equal to that of the circular profiled segments, if only small relative movement is desired, or of larger radius if a large amount of relative movement is desired. It may also be cylindrical if it is desirable to have movement such as that obtained with a splined shaft. The surface of the arcuate configuration is also provided with a bushing for protection against wear and for self-lubrication such as a Teflon insert.

---

The invention herein described was made in the course of or under a contract with the Department of the Navy.

The two general classifications of universal joints are the Cardan or Hookes joint and the constant velocity joint.

A Cardan or Hookes joint comprises a driving shaft or clevis, a trunnion and a driven shaft or clevis, for example, see joint 85 in Pat. 2,710,352 to Getting et al. The driving shaft is connected by two joint pins to the *x—x* axis of the trunnion and the driven shaft by two joint pins to the *y—y* axis of the trunnion. This type of universal joint, operating at a certain angle of axial misalignment, has the disadvantage that it does not provide uniform angular velocity of the driven shaft. If the driving shaft rotates at constant speed, the speed of the driven shaft will fluctuate during each revolution of the shaft resulting in undesirable vibrations. A further disadvantage of this type of joint is that each pair of joint pins has to carry the full load transmitted through the pivot assembly. Another disadvantage is that space limits and inaccessibility often prevent the use of proper pin and bearing sizes and lubrication; therefore, overload and vibration results in a short life of the unit and unreliable operation.

A constant velocity universal joint will transmit uniform angular velocity regardless of the angle of misalignment. It is basically a ball-type joint where the plane of the balls bisects the angle of the two shafts.

In one application, a Cardan-type universal joint is utilized as a flexible suspension for a nutating device. In this application operational conditions, environmental conditions and vibrations often overload the small size joint pins and bearings causing excessive wear of the joint pins and bearings resulting in a short life of the device and unreliable operation of the equipment due to contamination and failure of the joint and other components.

The present invention also represents an improvement over the type couplings described in Pat. 3,054,275 to Ongaro by providing a bushing between the mating surfaces of the shaft and housing whereby wear of the bearing surfaces is improved. Further, the circular segments of the present invention constitutes an improvement over the spherical teeth of Ongaro from the standpoint of retaining the shaft in the housing without additional components, manufacturing ease, long wear characteristics, as well as simplicity.

It should be noted here that the terms "circular shaped" and "circular profiled" are being used to describe a surface generated by two radii of different lengths and at substantially right angles to each other.

The present invention relates to a self-lubricated constant velocity universal joint allowing for a limited angle of axial misalignment and intended to replace, with full interchangeability, the unreliable Cardan-type universal joint in a flexible suspension or nutating device.

It also relates to a self-aligning, self-retaining and self-lubricated universal drive-shaft-coupling connecting a fixed driving shaft with a freely suspended driven shaft. The drive shaft is axially retained in the driving shaft and free to move longitudinally along its axis in the driven shaft.

The constant velocity universal joint of this invention consists of a pivot shaft with four circular shaped and circular profiled spline teeth and a pivot housing with four circular races matching the circular spline teeth. A thin layer of self-lubricating plastic-based bearing material, such as Teflon filled either with bronze, fiber glass, woven nylon, etc., is positioned between housing race and shaft teeth to reduce the friction and provide self-lubrication of the joint bearings. The joint shaft is interlocked with the joint housing against radial and axial relative motion providing only for articulated motion between the two.

The present invention overcomes the weakness of the Cardan-type universal joint by utilizing all four circular shaped spline teeth for transmitting the loads through the joint and to considerably increase each load carrying bearing surface and therefore decrease the bearing unit load. The Teflon bearing material provides for a lifelong self-lubricating operation without any maintenance.

The principal objects of this invention are:

(1) To provide for a pivot capable of operating in an environment of —65° F. to 350° F. temperatures for lifelong operation without lubrication or maintenance.

(2) To distribute the total transmitted loads through all four circular shape spline teeth, each having a large projected bearing surface, instead of through a pair of small joint pins with small projected bearing surfaces.

(3) To provide for a large circular spline tooth shape for a smooth operation and to reduce the unit bearing load to a minimum.

(4) To eliminate the fluctuating Cardan-type universal joint and replace it with a new type of nonfluctuating constant velocity universal joint.

A further object of the present invention is to provide a new and improved universal joint which eliminates the dual pair of pivot points and the interim member of the prior art by providing a two-piece universal joint wherein the shaft or male member has a plurality of substantially circular shaped and profiled segments, and the housing or female portion has a like plurality of arcuate recesses mating with said circular segments.

It is a further object of the present invention to provide a universal joint which will provide long life by having bearing surfaces formed between the circular and arcuate portions which will have a large bearing area and will wear but very slowly.

Another object of the present invention is to provide a two-piece universal joint which in combination with a wave guide can provide a long-life spiral scanning antenna.

It is yet another object of the present invention to provide a universal joint of the above type which may be readily and economically produced.

It is still another object of the present invention to provide for a self-aligning, self-retaining and self-lubricating universal drive shaft coupling to compensate for misalignments between driving and driven shafts.

The means for accomplishing the foregoing objects and other advantages, which will be apparent to those skilled in the art, are set forth in the following specification and claims and are illustrated in the accompanying drawings dealing with a basic embodiment of the present invention. Reference is made now to the drawings in which:

The illustrated embodiment of the inventive universal joint shown in FIGS. 1 to 4 is one that is used in connection with the nutating portion of a radar antenna. It is therefore shown with an open axial portion which would form a portion of the wave guide of an antenna. This, of course, is not intended in any way to limit the present invention to this particular use. It will become apparent from the following detailed description that the present invention may be used in many applications wherein a universal joint is desired which will stand up to high wear.

The present invention generally comprises two members, namely, the shaft or male member 10 and housing or female member 11. Each member may be provided with suitable flanges or other means, not shown, for attachment to the related shafts, pipes, housing, or the like. Each member also may be made of stainless steel or other suitable material.

Turning first to a consideration of the shaft or male member 10, the shaft comprises a plurality of outwardly directed circular shaped and profiled teeth 12 to 15. Only four have been shown for convenience; however, any suitable number may be used as necessary. These teeth are preferably at least four in number and are equilaterally spaced about the shaft. The central portion of the shaft may be provided with an axial orifice 16 as shown or an orifice of any desired shape or it can be solid according to the intended usage.

Figure 1:
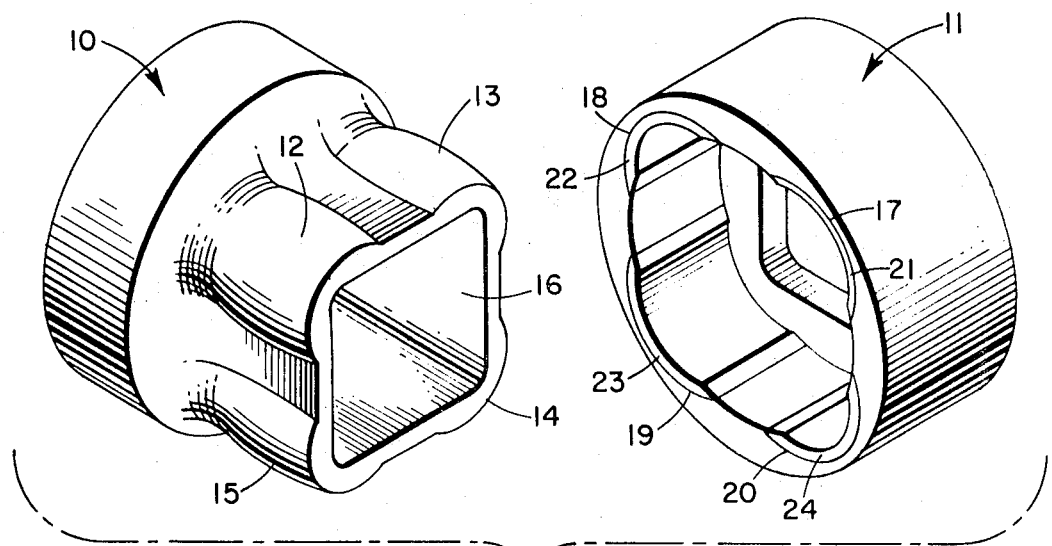
FIG. 1 is an exploded perspective of the universal joint of the present invention.
Figure 2:
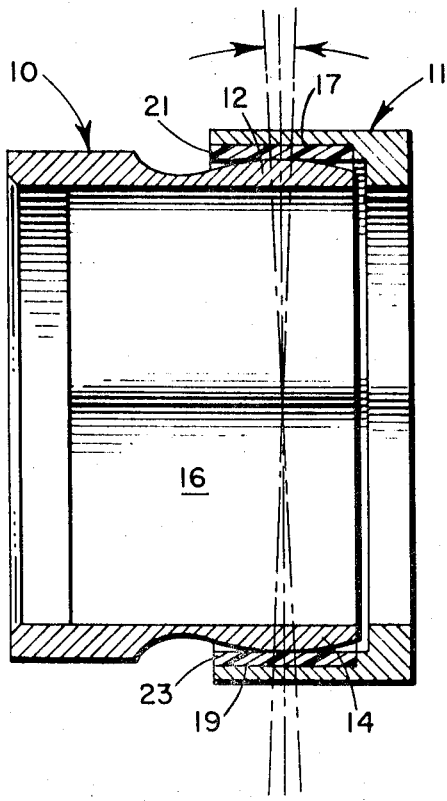
FIG. 2 is a vertical section through the universal joint taken at a point passing through two of the circular shaft segment profiles.

The housing or female member 11 has a like plurality of arcuate recesses 17 to 20 each of which is provided with a similarly shaped lining or bushing material 21 to 24. In the embodiment shown in FIGS. 1 and 2, the arcuate recesses are cylindrical in shape and the bushing formed therein is also of cylindrical shape on both its interior and exterior surfaces. The dimensions of the arcuate recess are such that its radius is similar to the radius defining the circular shape of the shaft teeth. The ratio of the radius for the circular profiles of the shaft teeth to the radius of the recesses provides clearance for the desired amount of misalignment. This arrangement allows, as shown in FIG. 2, for a large bearing surface between the circular portions of the shaft teeth and the cylindrical recesses of the housing member so that the area of wear is greatly increased and uniformly spread out. It also allows for a certain amount of misalignment or play as noted by the arrows.

The bearing material suitable for the present invention may be selected from any one of a number of materials such as Teflon which may be fastened in place by an epoxy resin or the like or a material such as a bronze of fiber glass-filled Teflon which would be held in position by suitable means such as rivets, not shown. Of course, any bearing material which is suitable for long-life conditions which preferably does not require the use of a lubricant could be used for the present invention.

Figure 3:
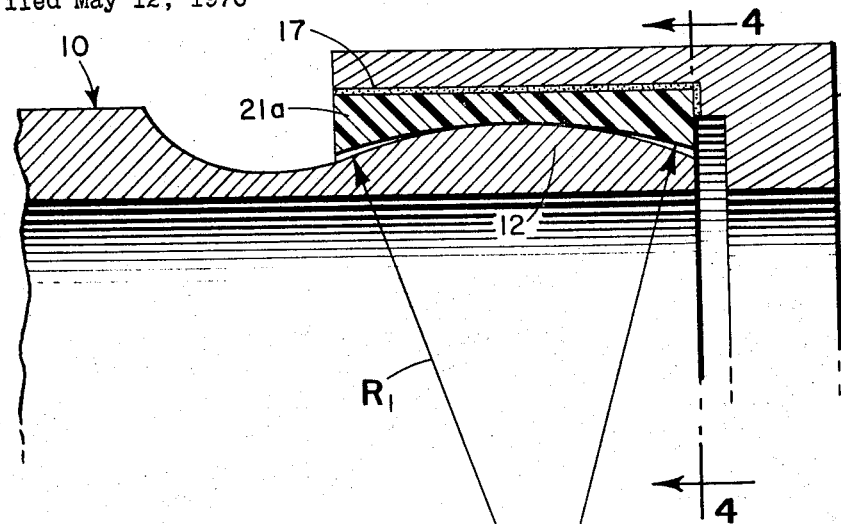
FIG. 3 is an enlarged section through a circular shaft segment profile of an alternate embodiment of the present invention.
Figure 4:
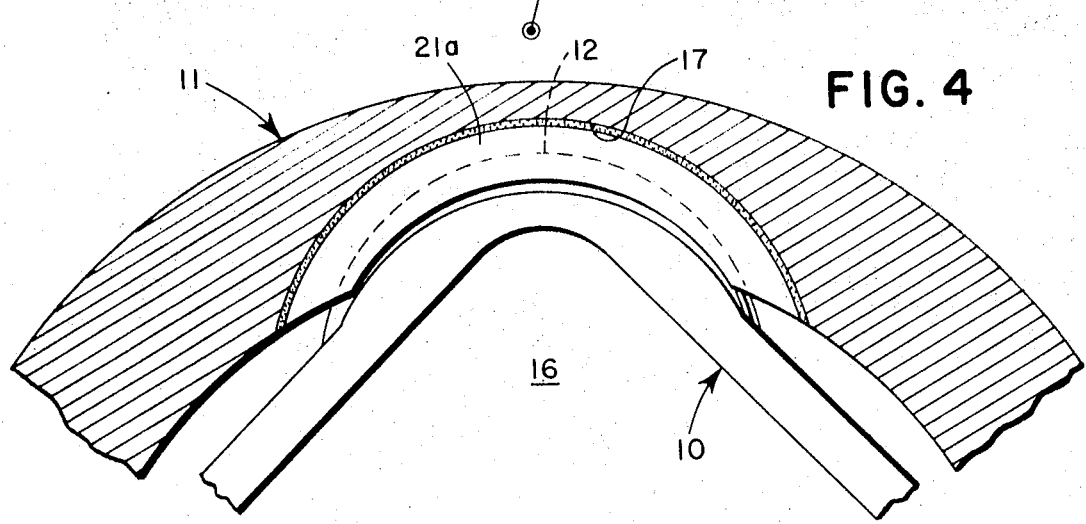
FIG. 4 is a view taken along line 4—4 of FIG. 3 showing the circular shape of a segment.

FIGS. 3 and 4 refer to an alternate embodiment of the present invention wherein bushing in the housing, instead of having cylindrically shaped inner surface, has a bushing 21a which is circular shaped in its interior profile but in which the radius of the circular shape of the housing bushes is of a larger radius than that of the circular portion of the shaft teeth.

Of course, it is within the purview of the present invention to provide for substantially any relative angular displacement of the two members by appropriately selecting the radii of the shaft and housing. In the embodiments illustrated, this radii ratio has been selected to have a swivel angle of approximately 2.5°. The swivel angle is a function of the radius $R_1$ of the circular teeth of the shaft to the radius $R_2$ of the arcuate recesses of the housing profiles.

Figure 5:
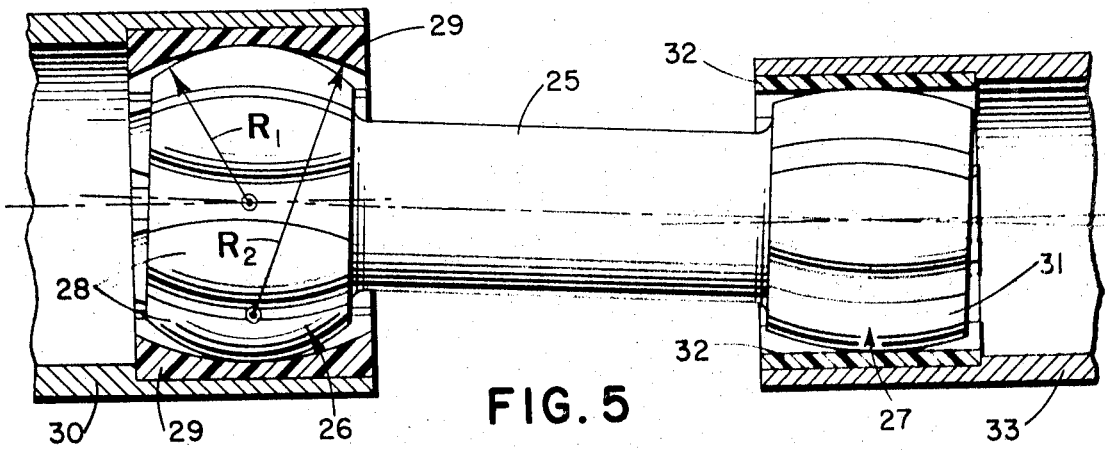
FIG. 5 shows the present invention employed as a splined shaft connecting a driving shaft to a driven shaft.

The splined shaft of FIG. 5 corresponds to the above-described embodiments in that the shaft 25 has its left end 26 formed similar to the embodiment of FIGS. 3 and 4 and its right end 27 similar to the embodiment of FIG. 2. The left end of shaft 25 has a plurality of teeth 28 contacting a like plurality of bushings 29 and in a housing 30, which housing may be either a drive or a driven shaft. The right end of shaft 25 has a plurality of teeth 31 contacting a like plurality of bushings 32 in housing 33. In this embodiment the bushings 32 are cylindrical on both their outer and inner surfaces thus allowing for some relative axial movement between the shaft 25 and housing 33. The left end bushings 29 are cylindrical on their outer surface only and have an interior surface which is circular and profiled in the manner of teeth 28 only with a larger radius. Thus the left end of the splined shaft provides for axial relative fixation.

The above-described invention may be embodied in other specific forms without departing from the spirit or essential characteristics thereof. The present embodiments are therefore to be considered in all respects as illustrative and not restrictive, the scope of the invention being indicated by the appended claims rather than the foregoing description, and all changes which come within the meaning and range of equivalency of the claims are therefore to be embraced therein.

I claim:

1. A universal joint comprising two members, the first of said members being a shaft and having a plurality of externally directed teeth having substantially circular profiles forming bearing surfaces, said circular profile being a surface generated by two radii of different lengths and at substantially right angles to each other, said second member being a housing having a like plurality of substantially arcuate recesses forming bearing surfaces, said members being assembled with said bearing surfaces in engagement thereby allowing relative angular movement of said members.

2. A universal joint according to claim 1, wherein the arcuate recesses of said housing have a circular profile with a larger radius than the circular profiled teeth of said shaft.

3. A universal joint according to claim 1, further comprising a bushing formed on each of said arcuate recesses, each said bushing having a configuration substantially the same as that of said arcuate recess.

4. A universal joint according to claim 1, wherein said arcuate recess is cylindrical in shape.

5. A universal joint according to claim 1, wherein said arcuate recess is circular profiled and has a radius larger than the radius of said circular profile of the teeth on said shaft member.

6. A universal joint according to claim 1, further comprising a bushing formed on each of said arcuate recesses, each said bushing having a substantially cylindrical outer surface and a substantially circular profiled inner surface, the radius of which is larger than the radius of said circular profiles of the teeth formed on the shaft member.

7. A universal joint according to claim 1, further comprising an annular passage formed in each of said members whereby said universal joint is suitable for use with a wave guide.

8. A spline shaft arrangement comprising a driving shaft, a driven shaft, and a spline shaft operatively interconnecting said driving and driven shafts, said spline shaft having formed on each end thereof a plurality of outwardly directed teeth having circular profiles forming bearing surfaces, said circular profiles being a surface generated by two radii of different lengths and at substantially right angles to each other, each of said driving and driven shafts having a housing formed on their facing ends, each said housing having a plurality of arcuate recesses formed therein forming bearing surfaces, said shafts being assembled with the teeth of said spline shaft engaging the recesses in said housing.

9. A spline shaft arrangement according to claim 8, wherein the recesses formed in one of said housings are cylindrical in shape thereby allowing relative axial displacement of said spline shaft with respect to said one housing and its associated shaft.

10. A spline shaft arrangement according to claim 8 wherein the recesses formed in one of said housings are circular profiled in shape with a radius greater than that of the associated teeth of the spline shaft whereby only angular relative displacement between the spline shaft and said one housing and its associated shaft is possible.

11. A spline shaft arrangement according to claim 8, further comprising bushings formed in each said arcuate recess of each said housing, said bushings being made of a long-life self-lubricating material.

References Cited
UNITED STATES PATENTS

| | | | |
|---|---|---|---|
| 3,408,829 | 11/1968 | Gage | 64—9 |
| 3,054,275 | 9/1962 | Ongaro | 64—9 |
| 2,854,829 | 10/1958 | Porter | 64—16 X |

EDWARD G. FAVORS, Primary Examiner

U.S. Cl. X.R.

64—16